United States Patent [19]
Musiari et al.

[11] Patent Number: 6,029,802
[45] Date of Patent: Feb. 29, 2000

[54] LINK IN A CHAIN FOR CONVEYING PRODUCTS

[75] Inventors: Clemente Musiari, Parma; Piero Mondello, Marzabotto, both of Italy

[73] Assignee: Rexnord Marbett S.P.A., Italy

[21] Appl. No.: 09/055,593

[22] Filed: Apr. 6, 1998

[51] Int. Cl.[7] .................................................. B65G 17/06
[52] U.S. Cl. ............................ 198/852; 198/853; 198/779
[58] Field of Search .................................... 198/779, 852, 198/853

[56] References Cited

U.S. PATENT DOCUMENTS

| | | | |
|---|---|---|---|
| 2,554,038 | 5/1951 | Lemmon | 198/779 |
| 4,821,869 | 4/1989 | Hodlewsky | 198/779 |
| 4,909,380 | 3/1990 | Hodlewsky | 198/779 |
| 5,330,045 | 7/1994 | Hodlewsky | 198/779 |
| 5,662,211 | 9/1997 | Quentin | 198/853 |

*Primary Examiner*—Christopher P. Ellis
*Assistant Examiner*—Joe Dillon, Jr.
*Attorney, Agent, or Firm*—Michael Best & Friedrich LLP

[57] ABSTRACT

A link in a chain for conveying—in an unusually reliable manner—products such as containers, packets and the like in a given direction, comprises a link body with opposite side edges, a pin which is inserted through the link body and has head and tail ends supported in the side edges, and a plurality of rollers mounted so that they can rotate idly on the pin between the side edges, the head end of the pin being inserted in the corresponding side edge by means of a snap action.

6 Claims, 3 Drawing Sheets

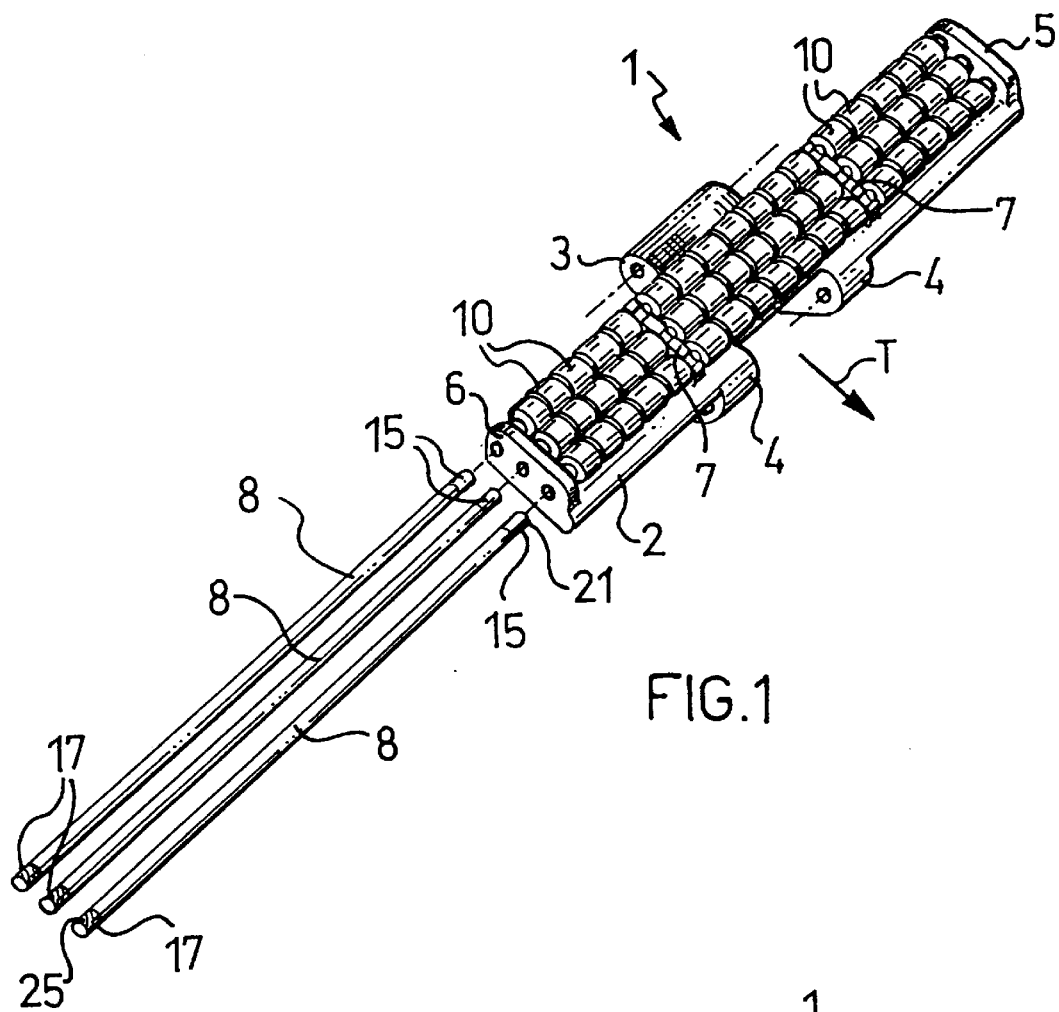
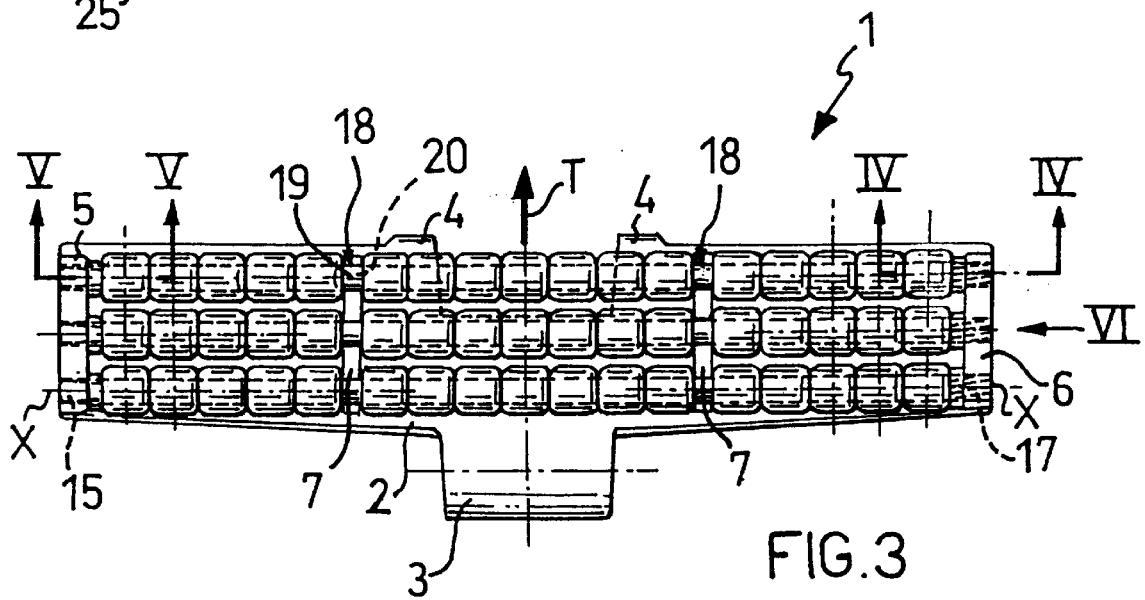

LINK IN A CHAIN FOR CONVEYING PRODUCTS

FIELD OF THE INVENTION

The present invention relates to a link in a chain for conveying products in a given direction, of the type comprising a link body with opposite side edges, a pin which is inserted through the link body and has opposite head and tail ends supported in the side edges, and a plurality of rollers mounted so that they can rotate idly on the pin between the side edges.

The function that needs to be fulfilled by the link, together with other links to which it is hinged and with which it forms a chain, is that of conveying products, such as containers, packets and the like, sometimes at high speed, in factories carrying out bottling, filling, labelling and similar operations. Moreover, it sometimes needs to allow the products to accumulate on the chain without there being any slip between the products and the chain.

BACKGROUND OF THE INVENTION

Although known links of the type described have proved satisfactory in many respects and are widely used, they do not offer the sort of fail-safe operation—at least not 100% fail-safe—that is desirable in the plant for which they are intended. Indeed it has been known, although such cases are very rare, for a pin and its associated rollers to work loose from a link, causing problems that may easily be imagined.

Great efforts have hitherto been made in an attempt to ensure that the pins and rollers cannot work loose, for example by securing the pins to the link body by means of modern fasteners such as snap rings and the like, spaced out along the pin spanning the side edges, or by riveting the ends of the pin. However, for various reasons which are not always clear, the said pins and rollers have nevertheless still managed to work loose.

The problem forming the basis of the present invention is one of devising a link of the type described, which has structural and functional characteristics capable of fulfilling the abovementioned purpose, while at the same time overcoming the drawbacks described with reference to the prior art.

SUMMARY OF THE INVENTION

This problem is solved by a link of the type described which is characterized in that one end of the pin is inserted in the corresponding side edge by means of a snap action.

BRIEF DESCRIPTION OF THE DRAWINGS

Further characteristics and the advantages of the link according to the present invention will become clear from the description set out below of a preferred embodiment thereof, given by way of non-limiting example and with reference to the appended figures, in which:

FIG. 1 shows a perspective view, with parts detached, of a link according to the present invention, FIG. 3 shows a plan view of the link in FIG. 1.

DETAILED DESCRIPTION OF THE INVENTION

Figures 4, 5:
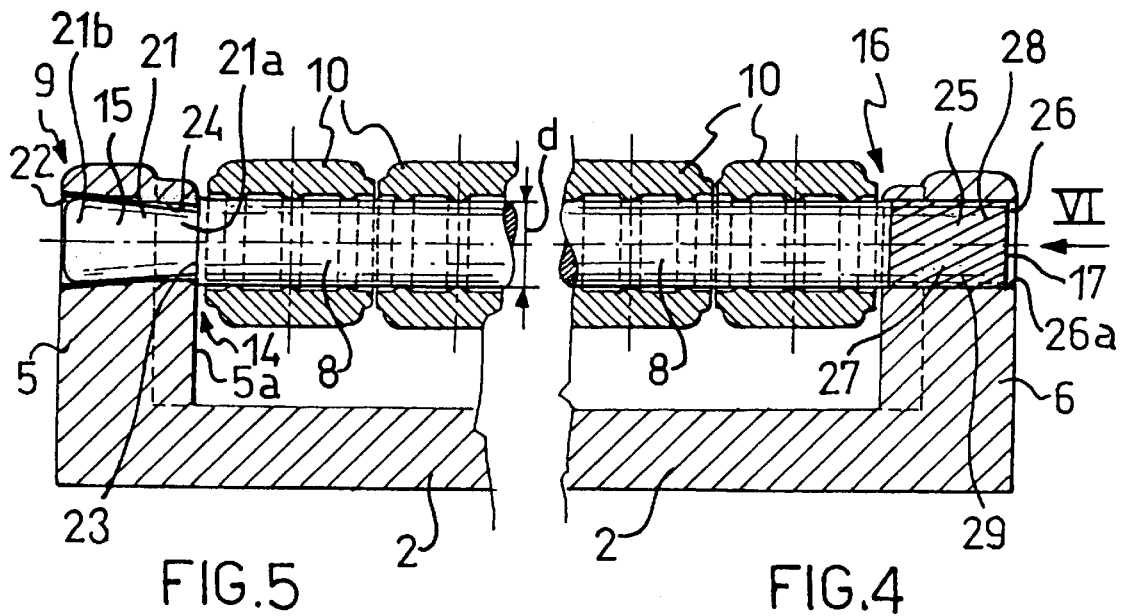
FIG. 4 shows a cross-sectional view on an enlarged scale of the link in FIG. 3, taken on the plane IV—IV.
FIG. 5 shows a cross-sectional view on an enlarged scale of the link in FIG. 3, taken on the plane V—V.
Figure 2:
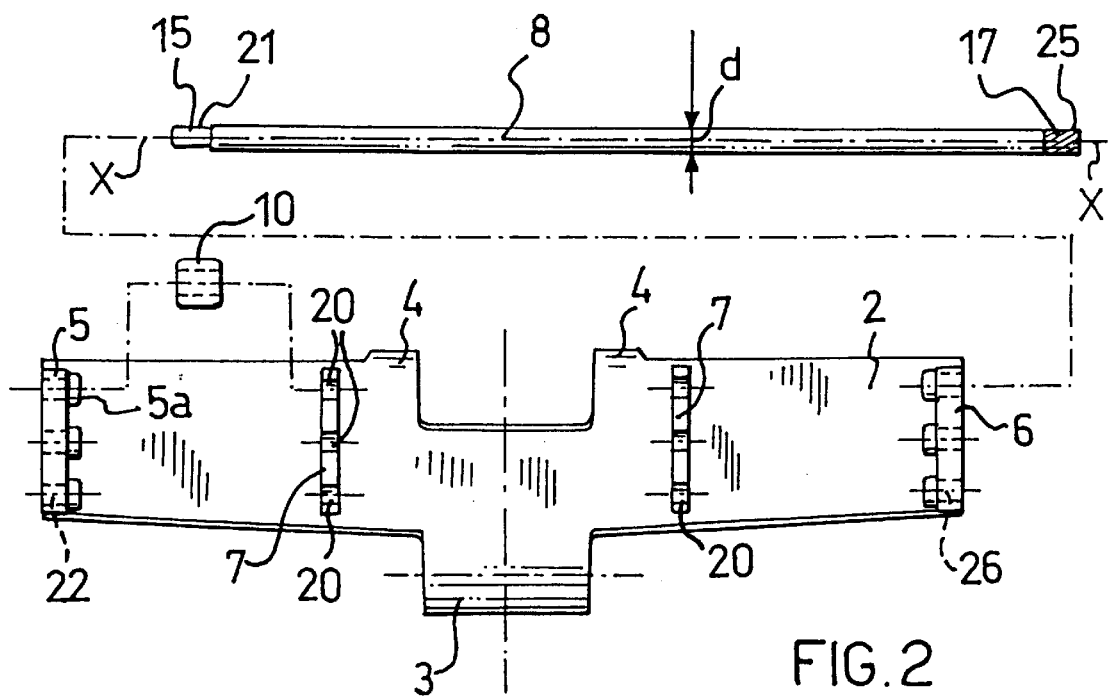
FIG. 2 shows a plan view of the link in FIG. 1, with parts detached.
Figure 6:
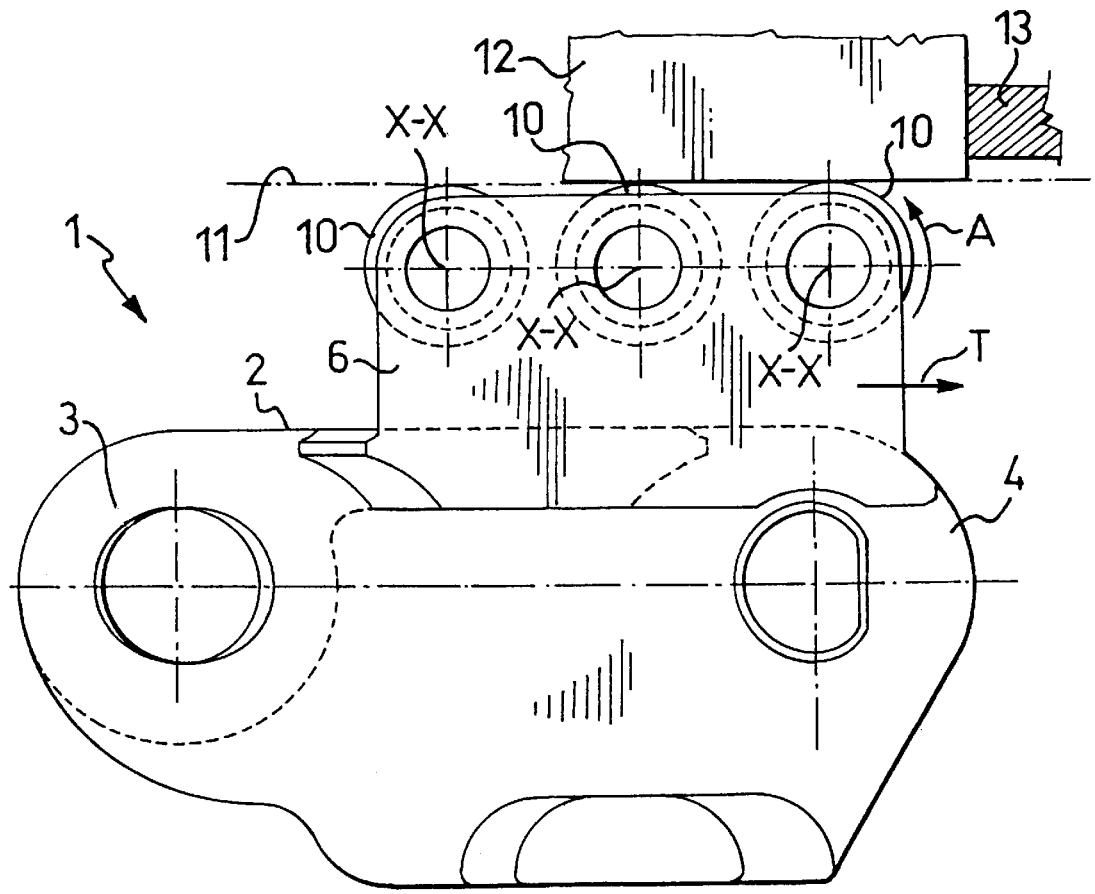
FIG. 6 shows a view on an enlarged scale of the link in FIG. 3, seen in the direction of the arrow VI.
Figure 7:
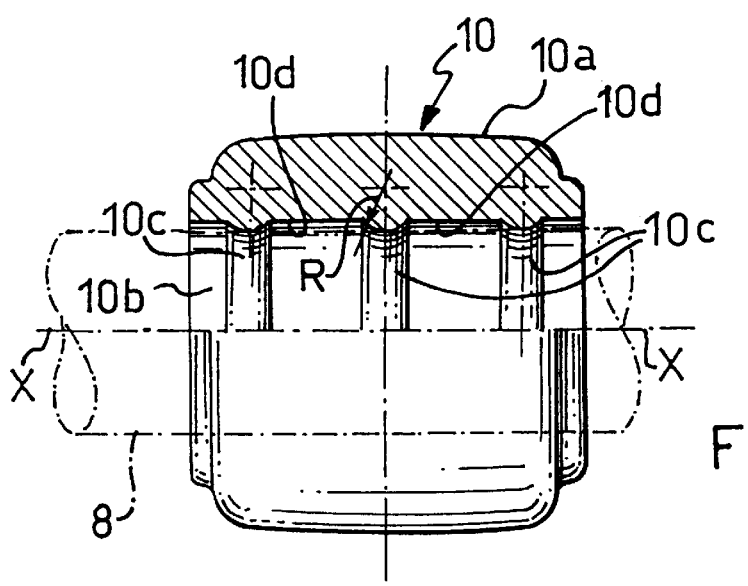
FIG. 7 shows a cross-sectional view, on an even larger scale, of a detail of the link in FIG. 3.

With reference to the appended figures, the reference numeral 1 denotes, as a whole, a link according to the invention. The link 1 is designed to be hinged to identical links in order to form a conveyor chain, having a conveying direction T, for conveying products, for example containers, packets and the like, in a factory carrying out bottling, filling, labelling and similar operations.

The link 1 comprises a link body 2, preferably made from a suitable plastic material, having an essentially wing-shaped structure that extends perpendicularly to the conveying direction T. The link body 2 comprises opposing eyes—a single eye 3 and a forked eye 4—via which the link is hinged to two identical adjacent links in the conveying chain.

The link body 2 comprises two opposite side edges 5 and 6—a left-hand side edge 5 and a right-hand side edge 6, respectively, when viewing the link in the conveying direction T—and two intermediate walls, both indicated by the reference 7, spaced out between the side edges 5 and 6.

The link 1 comprises three pins, all indicated by the reference 8, which have axes X—X perpendicular to the conveying direction T. Each pin 8 is in the form of a cylindrical rod, has a diameter d—which in the example is 5 mm—and is inserted through the link body 2. Each pin 8 is held in the link body 2 by retaining means 9 which will be described later.

The link 1 is completed by a plurality of rollers, all indicated by the reference 10, which are mounted so that they can rotate idly on the pins 8, between the side edges 5 and 6. More specifically, seventeen rollers 10 are mounted so that they can rotate idly on each pin 8, with the intermediate walls 7 dividing these rollers up into a central group of seven rollers and two lateral groups of five rollers each.

Together, all the rollers 10 of the link 1 constitute an imaginary plane 11 for supporting a product 12 to be conveyed in the direction T to a station 13, the latter being designed to receive the products and, in some cases, actually intended as a means of stopping the said products, which will then begin to accumulate on the conveying chain.

Each roller 10 has a slightly convex outer shell 10a and a through hole 10b through which the pin passes. The hole 10b has three annular projections 10c of slightly convex profile with a radius of curvature R which, in the example, is 2 mm. Two annular recesses 10d are defined between the adjacent annular projections 10c.

The retaining means 9, which hold each pin 8 in the link body 2, comprise a snap-action coupling 14 between a head end 15 of the pin and the left-hand side edge 5, and a force-fit coupling 16 between a tail end 17 of the pin and the right-hand side edge 6.

The retaining means 9 are completed by a tight-fit coupling 18 between each intermediate wall 7 and a corresponding intermediate portion 19 of the pin, this portion being inserted in a cradle-shaped seating 20 which is open at the top of the said intermediate wall 7.

The snap-action coupling 14 is achieved by virtue of the fact that the head end 15 of the pin 8 comprises a mushroom-shaped portion 21 which engages by means of snap action in a seating 22 formed in the left-hand side edge 5.

The mushroom-shaped portion 21 comprises a flared stem 21a which extends from a shoulder 23 formed in the pin, and a rounded head 21b whose diameter is approximately the same as the diameter d. The seating 22 has a narrowed opening 24 whose diameter is smaller than the diameter d and which widens, as a result of the inherent elasticity of the plastic from which the link body is made, as the head 21b of the mushroom-shaped portion 21 is inserted into the seating 22.

It should be noted that when the mushroom-shaped portion 21 has engaged by means of snap action in the seating 22, the shoulder 23 is in contact with and presses against the left-hand side edge 5, and more specifically against a wall 5a thereof.

The force-fit coupling 16 is achieved by virtue of the fact that the tail end 17 of the pin 8 comprises a portion 25 that extends into a through hole 26 formed in the right-hand side edge 6.

The portion 25 has irregularities 27 that take the form of a plurality of helical ridges 28 which together form a screw thread 29, preferably produced by knurling, with the helical ridges having a given direction and interfering with the hole 26, and more specifically cutting into an internal cylindrical wall 26a thereof with an essentially self-tapping action.

In this example, where the pin is inserted into the link body from the right—that is when viewing the link in the conveying direction T—the helix is a right-handed helix.

During use, the pin is securely held in the link body as a result of the snap-action coupling and cannot work loose.

If, as the link advances in the conveying direction T, a product 12 reaches the station 13, as soon as the latter begins to act as a stop means, all the products are prevented from advancing further and consequently cause the rollers 10 to rotate, so to speak, in reverse, in the direction of the arrow A. As a result of this rotation, the pin is subjected to a torque in the same direction, due to the friction between the roller and the pin.

Given the large number of rollers on the pin, together with the fact that the friction, which is usually low, can occasionally be increased by incipient seizing which can occur between a roller and the pin, this torque can reach significant levels.

By virtue of the coupling between the helical ridges 28 and the wall 26a of the hole 26, and under the action of the said torque, the pin tends to screw into the link body in a direction such that the shoulder 23 is pressed more firmly against the wall 5a of the side edge 5, with the result that the said pin is held even more securely in the link body and, in practice, cannot work loose under any circumstances.

It should be noted that, as the rollers rotate about the pin during use, contact between these two elements is restricted to the annular projections and that any particles resulting from wear remain inside the roller, occupying the recesses between the annular projections.

The main advantage of the link according to the present invention lies in the unusual degree of reliability achieved. This is because the pin is held securely in the link body on account of the very structure of both these elements, a structure which is in itself invariable over time, is absolutely secure and is completely self-sufficient, in other words it does not require any additional small parts such as fasteners, springs and the like. Moreover, rather than adversely affecting the link's reliability, any potentially disruptive situations—such as an accumulation of products—actually help to hold the pin even more securely in the link body.

A further advantage of the link according to the present invention lies in its constructional simplicity and in its speed of manufacture, not insignificant advantages for an article that has to be mass-produced in large and even very large numbers.

A further advantage of the link according to the present invention is that it has meant quieter operation of the conveyor chain as a whole. This is because the link according to the present invention is made up of a limited number of parts, this number being reduced to an absolute minimum. Moreover, it could be said that there is no relative movement between the pin and the link body and that these constitute virtually a single piece.

A further advantage of the link according to the present invention lies in the fact that it is more hygienic. This is because it does not have any parts that could harbour dirt which might originate from the outside and it has in-built recesses designed to trap any impurities that might be produced within itself.

Needless to say, a person skilled in the art could, in order to satisfy contingent and specific requirements, make numerous modifications and changes to the link described above, all such modifications and changes moreover being encompassed within the scope of protection of the invention, as defined by the following claims.

We claim:

1. A modular conveyor chain link comprising:
    a link body having opposing side edges one of said opposing side edges having formed therein a seating with a narrowed opening facing the second side edge, said narrowed opening having a first diameter;
    a pin inserted through the link body, said pin having a second diameter greater than the first diameter, and a head end and a tail end being respectively supported in each of said opposing side edges, said head end of said pin being mushroom-shaped and engaging said seating by snap action insertion in a pin axial direction between said opposing side edges through the narrowed opening; and
    a plurality of rollers mounted on said pin between said opposing side edges such that said rollers rotate idly on said pin.

2. The chain link of claim 1, wherein said head end of said pin includes a shoulder which abuts against said side edge when said mushroom-shaped head end is inserted in said side edge.

3. The conveyor link of claim 2, wherein said tail end of said pin comprises surface irregularities that interfere with said other side edge.

4. The chain link according to claim 3, wherein said irregularities include at least one helical ridge.

5. The chain link according to claim 3, wherein said irregularities include a plurality of helical ridges that form a screw thread.

6. A modular conveyor chain link comprising:
    a link body having opposite side edges;
    a pin having a head end and a tail end, said head end and said tail end being supported in said side edges of said link body, said head end of said pin being inserted in one of said corresponding side edges by means of a snap action; and
    a plurality of rollers mounted on said pin between said side edges such that said rollers rotate idly on said pin, each of said rollers including a hole through which the pin passes, said hole having at least two annular projections which define a recess.

* * * * *

UNITED STATES PATENT AND TRADEMARK OFFICE
CERTIFICATE OF CORRECTION

PATENT NO : 6,029,802
DATED : February 29, 2000
INVENTOR(S): Clemente Musiari and Piero Mondello It is certified that error appears in the above-identified patent and that said Letters Patent is hereby corrected as shown below:

Title page, item [30] Foreign Application Priority Data --add

April 14, 1997 [IT]   Italy...................MI97A000858

Signed and Sealed this

Sixth Day of February, 2001

Attest:

Q. TODD DICKINSON

*Attesting Officer*                    *Director of Patents and Trademarks*